Jan. 23, 1968 H. C. SWIFT 3,365,031
CALIPER TYPE DISK BRAKE WITH AUTOMATIC ADJUSTER
Filed Aug. 17, 1966 3 Sheets-Sheet 1
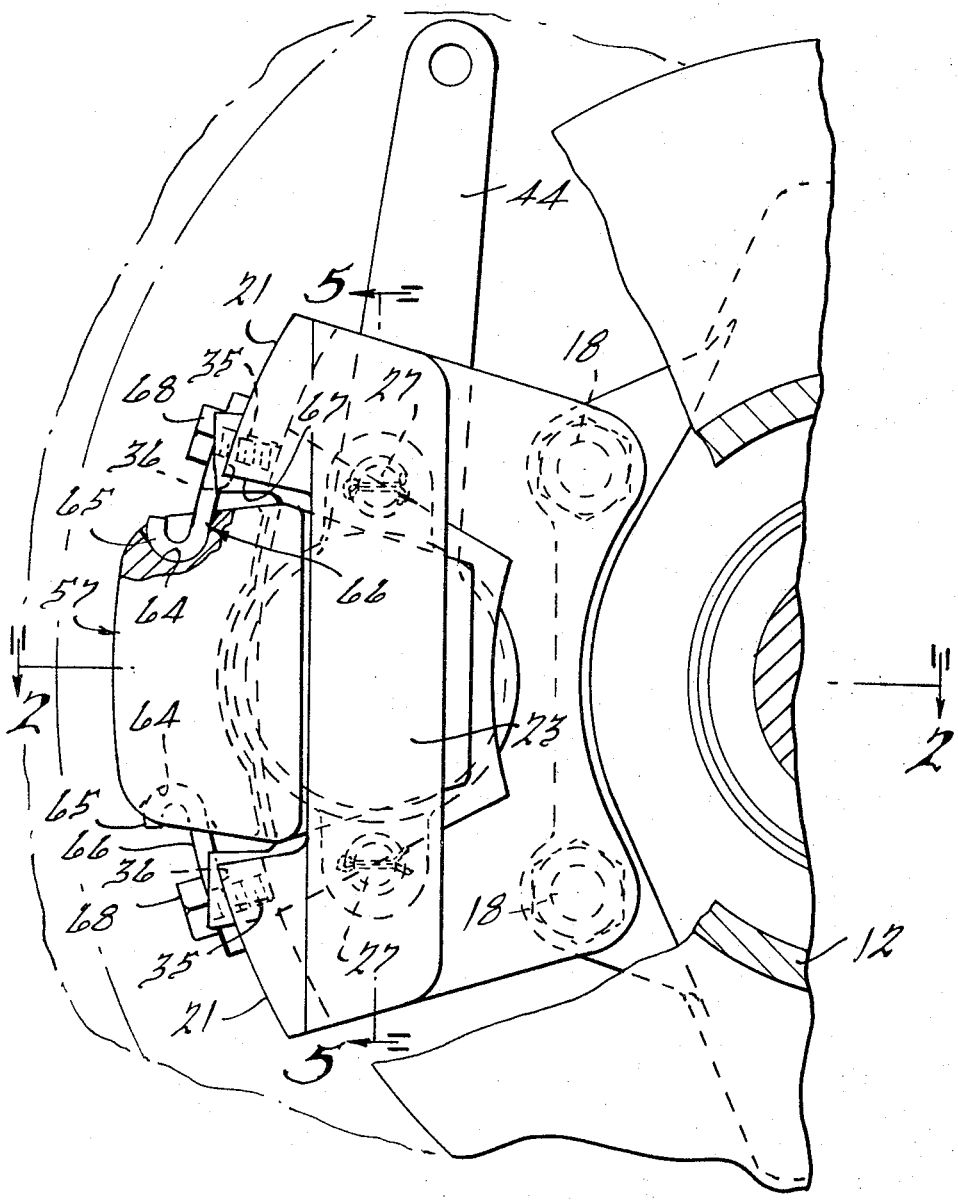
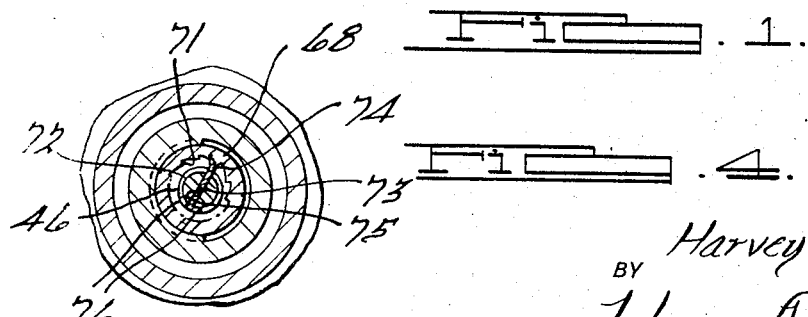
INVENTOR.
Harvey C. Swift
BY
Harness, Dickey & Pierce
ATTORNEYS

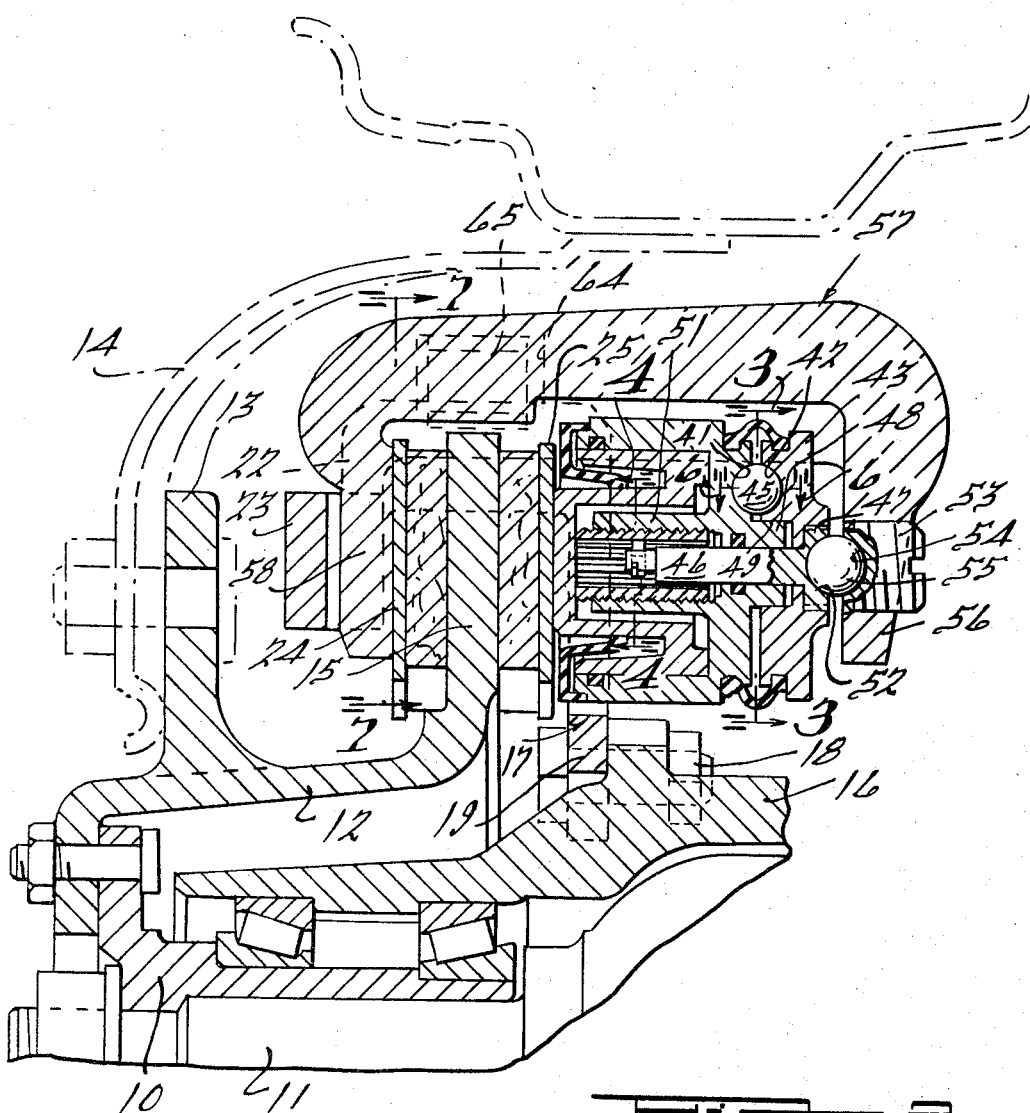

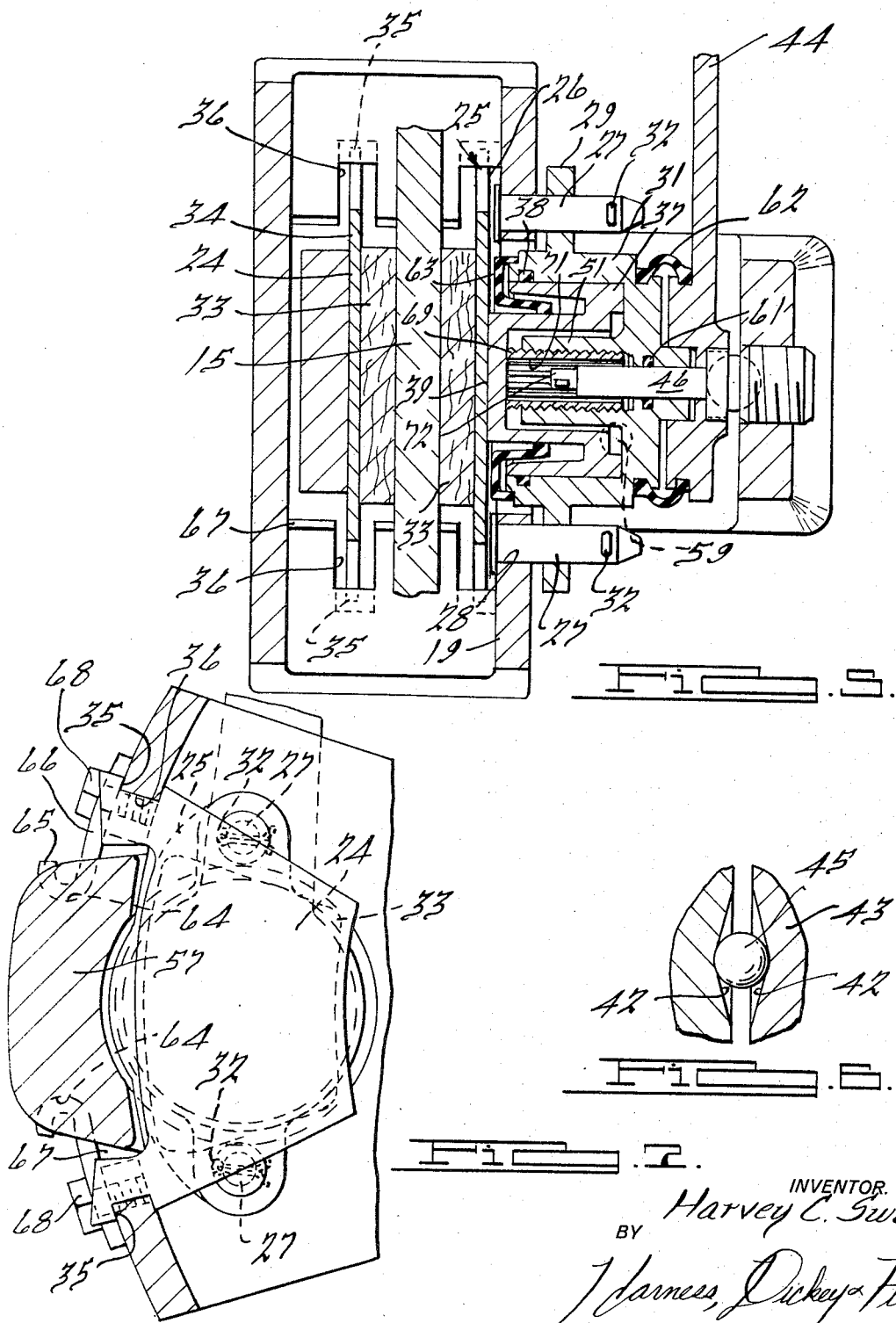

United States Patent Office 3,365,031
Patented Jan. 23, 1968

3,365,031
CALIPER TYPE DISK BRAKE WITH
AUTOMATIC ADJUSTER
Harvey C. Swift, Birmingham, Mich., assignor to Kelsey-Hayes Company, a corporation of Delaware
Filed Aug. 17, 1966, Ser. No. 572,931
5 Claims. (Cl. 188—73)

ABSTRACT OF THE DISCLOSURE

Brake pads for a disk brake are applied to each side thereof and are moved in unison by a piston within a movable cylinder against both sides of the disk with equal force. For manually applying the pads a lever is provided to move the cylinder to apply the braking force. The manual movement of the lever positions the piston relative to the movable cylinder to take up slack which may occur as a result of wear on the pads.

---

In a copending application of D. A. Schutte et al., Ser. No. 574,504, filed Aug. 22, 1966, for Disk Brake With Automatically Adjusted Mechanical Actuator, which was assigned to the assignee of the present invention, a disk brake structure is illustrated, described and claimed which is similar to the present invention.

In the present arrangement, the legs of a caliper type element spans the brake disk with two brake pads and an operating piston and cylinder disposed therebetween. The expansion of the cylinder and piston applies a direct force to one pad and to the caliper element which is moved simultaneously to apply a force to the other pad. As the brake lining wears on the face of the supporting plates greater movement is required between the cylinder and piston. This undesirable feature has been overcome by the present invention when limiting the relative movement between the piston and the cylinder. This maintains the movement between the piston and caliper to a minimum in all conditions of wear of the brake lining and disk surfaces. A frame supports one of the plates of a brake pad on a pair of pins, the opposite ends of which support the cylinder in floating relation to the support for the pins. The plate of the opposite pad is supported on the wall of the caliper, which is disposed adjacent thereto or on pins or other securing means attached to the supporting frame for the caliper. A lever is mounted at the end of the cylinder for rolling balls up inclined planes and move the cylinder and piston to cause them to apply a force between the caliper and the brake pads. This lever is connected to the hand brake lever to permit manual operation by the driver of the vehicle.

Accordingly, the main objects of the invention are: to provide a brake for a disk on the wheel housing of a vehicle which applies brake pads to opposite faces thereof when a piston is urged from a cylinder and when the piston and cylinder are advanced in unison to provide manual operable means between the cylinder and one leg of a U-shaped member for applying a braking pressure between one of the brake pads and the leg while the other leg applies the same pressure to the other pad; to provide a member actuated manually for rotating a threaded sleeve within the piston for lengthening the end which abuts the cylinder to take up any play therebetween caused by the wear of the brake pads and disk faces and, in general, to provide automatic adjusting means for taking up slack in a disk brake which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken view in elevation of a disk brake operating mechanism embodying features of the present invention;

FIG. 2 is a sectional view of the structure illustrated in FIG. 1 taken on the line 2—2 thereof;

FIG. 3 is an enlarged sectional view of the structure illustrated in FIG. 2, taken on the line 3—3 thereof;

FIG. 4 is an enlarged, broken sectional view of the structure illustrated in FIG. 2, taken on the line 4—4 thereof;

FIG. 5 is a sectional view of the structure illustrated in FIG. 1, taken on the line 5—5 thereof;

FIG. 6 is an enlarged, broken sectional view of the structure illustrated in FIG. 2, taken on the line 6—6 thereof, and FIG. 7 is a sectional view of the structure illustrated in FIG. 2 taken on the line 7—7 thereof.

Referring to the figures, a hub 10 on an axle 11 supports a spider 12 having an annular flange 13 for supporting a wheel 14, illustrated in dot dash line in FIG. 2. The hub extends further inwardly and forms a brake disk 15. A fixed axle housing 16 has a brake supporting element 17 secured thereto by a pair of bolts 18. The supporting element 17 is U-shaped having a downwardly extending leg 19, a top web 21 and a downwardly extending leg 22 which has an outwardly deflected bottom portion 23. The brake disk 15 is disposed between the leg 19 and the deflected portion 23 of the leg 22. A brake pad 24 is disposed on the outer side of the brake disk 15 while a brake pad 25 is disposed upon the inner side thereof. The brake pad 25 has a plate 26 the outer edges of which engage the web 21 to support the pad 25 for movement toward and away from the disk 15. A pair of headed pins 27 are supported in apertures 28 in the leg 19 of the supporting element 17 and extend through ears or projections 29 of a cylinder 31 to support the cylinder 31 for axial sliding movement. The pins 27 are retained by cotter pins 32 adjacent to the outer ends thereof.

The plate 26 has a braking material 33 adhered, riveted or otherwise secured thereto with the face disposed adjacent to the inner surface of the brake disk 15. The brake pad 24 has a plate 34 with a pad of brake material 33 applied to the face adjacent to the outer surface of the brake disk 15. The upper outer edges of the pair of plates 34 have notches 35 therein which extend within notches 36 in the transverse web 21 of the supporting element 17. In this manner the brake pads are supported for movement against the faces of the disk 15 for applying a braking force thereto.

A piston 37 is mounted within the cylinder 33 sealed thereto by a sealing ring 38. The end 39 of the piston engages the plate 26 of the brake pad 25, as illustrated in FIGS. 2 and 5. The end face of the cylinder is provided with a plurality of dished elongated grooves 41 which are disposed opposite to similar grooves 42 in a plate 43, having a manually operable handle 44 in extension thereof. A ball 45 is mounted in each pair of mated grooves 41 and 42 and urge the cylinder to the left when the handle 44 is moved in either direction of rotation to cause the balls 45 to climb up on the sloping surfaces of the grooves 41 and 42. The plate 43 supports a pin 46 having a head 47 recessed therein and fixed to the plate. The end of the cylinder 31 has a cylindrical boss 48 received by a cylindrical aperture 49 in the plate 43. The pin extends through the plate 43 and the boss 48 into an internally threaded sleeve 51 aligned with the axis of the cylinder.

The head 47 has a spherical recess 52 aligned with a set screw 53 having a spherical recess 54 aligned with the recess 52. A ball 55 is disposed in the recesses 52 and 54 of the head 47 and set screw 53. The set screw is threaded into a downwardly extending leg 56 of a caliper element 57, the opposite end of which carries a downwardly extending leg 58. The reactive force between the cylinder 31 and piston 37, when separated by fluid pressure, is applied between the two legs 56 and 58 of the caliper element 57 to the pressure pads 24 and 25 which are moved with equal force to engage opposite faces of the brake disk 15. Thus, when the handle 44 is arcuately moved in either direction or fluid is provided between the cylinder 31 and piston 37 through an orifice 59, a braking force will be applied with equal intensity to each of the brake pads 24 and 25. A flexible sealing ring 61 seals the pin 46 to the aperture through the end of the cylinder 31. Sealing sleeves 62 and 63 seal the plate 43 to the end of the cylinder 31 and seal the opposite end of the cylinder 31 to the adjacent end of the piston, respectively.

It will be noted in FIGS. 1 and 7 that the caliper element 57 has U-shaped recesses 64 on opposite sides for receiving U-shaped ends 65 of fingers 66. The fingers are secured to the adjacent ends of the transverse web 21 which has a rectangular recess 67 provided therein. It will be noted in FIG. 2 that the length of the recess 64 is greater than the width of the finger 66 to permit the forward and rearward movement of the caliper element 57 during application of the pads 24 and 25 to the surfaces of the brake disk 15 and the release of the pads therefrom.

For the purpose of taking up slack between the piston 37 and the plate 26 of the brake pad 25, the internally threaded extension 51 within the cylinder 31 has an externally threaded sleeve 69 screwed therewithin. The sleeve 69 is provided with ratchet teeth 71 on the inner surface extending from one to the other end thereof. The end of the pin 46 has a reduced end portion 72 containing a flat spring finger 73. The finger end 74 engages one of the ratchet teeth 71 and advances the sleeve 69 when the pin 46 is moved counterclockwise. When the pin is moved clockwise, the finger 74 will ride over one of the serrated teeth 71 to engage the next tooth and cause the sleeve 68 to rotate counterclockwise when the pin 46 is rotated counterclockwise. The movement of the pin 46 in the opposite direction is produced by the movement of the handle 44 and its associated plate 43. The finger 73 extends through a slot 75 in the end portion 72 and the tooth engaging end 74 is bent where it emerges from the slot 75. The opposite end of the finger 73 is divided into two parts 76, which are bent in opposite directions against the wall adjacent to the slot.

Adjustment is initially provided by the set screw 73 to properly position the two pads 24 and 25 on opposite sides of the surface of the brake disk 15. In normal operation, the introduction of fluid under pressure through the orifice 59 moves the face 39 of the piston 37 against the plate 26 of the brake pad 25, the action of which moves the caliper 57 in the opposite direction to have the leg 58 thereof apply a similar force to the plate 34 of the brake pad 24. This applies equal pressure on opposite sides of the face of the brake disk 15. Wear will occur on the faces of the lining material 33 so that greater movement will be required between the piston and cylinder to apply the brake pressure. To maintain the same movement and compensate for wear, manual operation takes up the slack due to wear. Each time the handle 44 is operated to apply a hand brake operation by the balls 45 moving up the sloping walls 41 and 42 of the cylinder and plate, the pin 46 will be rotated to have the spring finger 74 move in either a clockwise or counterclockwise direction depending upon which direction the handle was moved. When putting on the brake manually, the pin will move in a counterclockwise direction to rotate the sleeve 68 and cause it to be moved toward the piston end having the face 39 to thereby limit the retractive movement of the piston within the cylinder. Upon the release of the handle 44, the spring finger 74 is rotated clockwise to ride over a tooth of the ratchet teeth 71 to be in position to advance the sleeve 68 upon the next movement of the handle to apply the brake. Should the sleeve 68 be tightened to a miximum desired amount any further tightening would be resisted and the spring finger 74 will bend and no shifting of the sleeve 68 will occur. This bending will continue until the brake pads 24 and 25 are further worn to provide clearance which will permit the finger 74 to again advance the sleeve 68. This prevents a brake applying force from being built up in the system while at the same time preventing an accumulation of slack from occurring to the brake parts.

What is claimed is:

1. In a disk brake mechanism for an automotive vehicle, a brake disk rotatable with the wheel of the vehicle, a fixed supporting element, brake pads supported on opposite sides of the brake disk movable relative to said fixed element, a caliper element having legs spanning the brake pads and movable relative to said fixed element, a fluid cylinder supported for axial movement relative to said caliper, a piston in said cylinder disposed between one of the brake pads and one leg of the caliper, manually operatable means rotatable in a plane parallel to said leg between the cylinder and said one leg for manually applying a force between the legs and the brake pads when moving said cylinder away from said one leg, and means adjustable between said one leg and piston for positioning the piston within the axially movable cylinder.

2. In a disk brake mechanism, as recited in claim 1, wherein the back and forth operation for manually setting the brakes limits the return movement of the piston within said cylinder and thereby takes up the play occurring through the wear of the brake pads and disk surfaces.

3. In a brake disk mechanism as recited in claim 2, wherein the cylinder has an internally threaded sleeve on its axis, an externally threaded sleeve within the internally threaded sleeve of the cylinder, and means actuated by the manual operable means for producing the rotation of the external threaded sleeve.

4. In a disk brake mechanism, as recited in claim 3, wherein ratchet teeth are provided within the externally threaded sleeve and said manual operating means has a pin extending into the sleeve, and a finger on the end of the pin having a detent end which ratchets over the ratchet teeth.

5. In a disk brake arrangement, as recited in claim 4, wherein the pin has a spherical recess, a set screw on one said leg having a mating sperical recess, and a ball within the recesses through which adjustment is provided by the set screw to initially set the pressure between the pads and the disk surfaces.

References Cited

UNITED STATES PATENTS

| 3,243,016 | 5/1967 | Press | 188—196 X |
|---|---|---|---|
| 3,321,050 | 5/1967 | Swift | 188—196 X |

FOREIGN PATENTS

| 1,186,282 | 1/1965 | Germany. |
|---|---|---|
| 1,028,649 | 5/1966 | Great Britain. |
| 346,777 | 7/1960 | Switzerland. |

FERGUS S. MIDDLETON, *Primary Examiner.*

MILTON BUCHLER, *Examiner.*

G. E. HALVOSA, *Assistant Examiner.*